United States Patent [19]

Suzuki et al.

[11] Patent Number: 4,520,406
[45] Date of Patent: May 28, 1985

[54] VIDEO TAPE RECORDER WITH RECORD REVIEW MODE FOR EDITING SIGNALS RECORDED ON MAGNETIC TAPE

[76] Inventors: Toshinori Suzuki, c/o Sony Corporation, 7-35 Kitashinagawa 6-chome, Shinagawa-ku, Tokyo; Minoru Ozawa, c/o Aiwa Co., Ltd., 209, Kandasuda-cho, Chiyoda-ku, Tokyo, both of Japan

[21] Appl. No.: 361,149

[22] Filed: Mar. 24, 1982

[30] Foreign Application Priority Data

Mar. 25, 1981 [JP] Japan ................................. 56-43581

[51] Int. Cl.³ .......................................... H04N 5/782
[52] U.S. Cl. .................................. 360/14.2; 360/74.4
[58] Field of Search ........................... 360/14.1–14.3, 360/13, 33.1, 72.1–72.2, 74.1, 74.4; 358/335, 906, 311; 369/83

[56] References Cited

U.S. PATENT DOCUMENTS

| | | | |
|---|---|---|---|
| 3,974,522 | 8/1976 | Fukatsu et al. | 360/14.2 |
| 4,100,607 | 7/1978 | Skinner | 360/14.2 |
| 4,115,819 | 9/1978 | Shigeta | 360/14.1 |
| 4,163,263 | 7/1979 | Rotter | 360/14.1 |
| 4,280,149 | 7/1981 | Bragas | 360/14.1 |
| 4,358,797 | 11/1982 | Nishijima et al. | 360/14.2 |
| 4,428,001 | 1/1984 | Yamamura et al. | 360/14.1 |

Primary Examiner—Raymond F. Cardillo, Jr.
Attorney, Agent, or Firm—Lewis H. Eslinger; Alvin Sinderbrand

[57] ABSTRACT

A video tape recorder (VTR) adapted for use in editing tapes so that a second signal may be recorded on the tape to accurately and closely follow a first signal recorded thereon is provided with a record review mode where a portion of the first recorded signal immediately preceding the changeover, or edit, point may be reviewed prior to recording the second signal. The VTR is of the type which, upon being placed in a pause mode, automatically rewinds the tape by a length corresponding to a first predetermined number of control signals. In the VTR according to the present invention, upon entering the review mode, the tape is automatically rewound for a second length and then played back for a third length corresponding to but slightly less than the sum of the first and second lengths. Thereafter, the VTR automatically reenters the pause mode to be rewound again by the first predetermined length.

6 Claims, 13 Drawing Figures

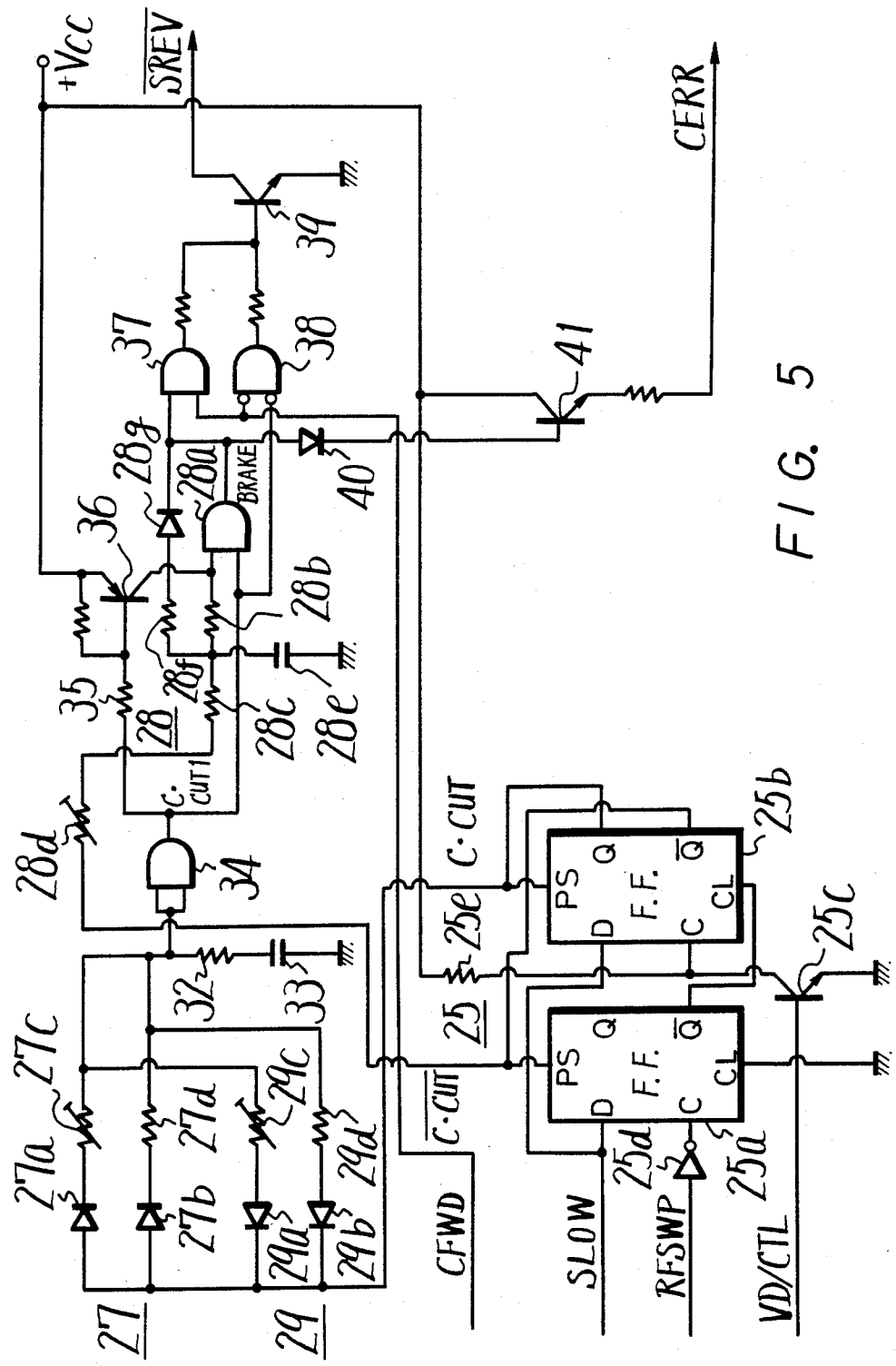
F I G. 5

VIDEO TAPE RECORDER WITH RECORD REVIEW MODE FOR EDITING SIGNALS RECORDED ON MAGNETIC TAPE

BACKGROUND OF THE INVENTION

1. Field of the Invention

This invention relates to video recording and/or reproducing apparatus, and is more particularly directed to video tape apparatus whereby editing of a video signal may be carried out.

2. Brief Description of the Prior Art

Conventional video tape recorders (VTRs), of the type having one or more rotating heads which scan the video tape at an angle to the direction of advancement thereof, can be adapted to be set into editing modes so that a new scene is recorded continuously after a previously recorded scene. In one much mode, sometimes called an assemble mode, after one scene is recorded, the VTR is stopped, following which another scene is recorded immediately thereafter. In another mode, sometimes called an insert mode, a new scene is recorded between two scenes which were recorded previously on the tape.

In either the insert or assemble mode, the edit points, i.e., the points connecting the respective successive scenes, are determined, for example, by an operator viewing the video picture on a monitor. In a usual edit operation, the operator stops the VTR at a selected point by depressing a pause button. Then, when the operator is ready to record the new video material, the VTR is released from its pause mode and is set into its record mode, and a new video scene is recorded beginning at the edit point.

Whenever such assemble or insert recording operations are performed, care must be taken to prevent the video signal from generating confusion or noise at the edit point. For this reason, at the edit point the pitch of the recording head traces should correspond to the pitch of the tracks previously recorded on the tape. If the pitch of the recorded tracks changes discontinuously at the edit point, the reproduction of the recorded signals in the tracks around the edit point will become degraded. More particularly, when the track pitch changes, the reproducing heads will not accurately scan the recorded signal, and the reproduced picture will become noisy. Also, when the track pitch changes, the reproduced vertical and horizontal synchronizing signals will occur at a time that does not correspond to previously picked up synchronizing signals, and synchronization of the reproduced video will become unreliable.

In order to avoid changes in the track pitch at an edit point, conventional techniques take advantage of a control track recorded at one edge of the video tape, and recognize that the positions of the video tracks correspond accurately to positions of the control signal recorded on the tape. That is, in the recorded signal after editing, the pulses of the control signal have a constant pitch $\tau_c$.

In order to avoid changes in track pitch, the recording of the tracks of the new video signal should be controlled by the tracking servo system of the VTR, so that the tracks are recorded at locations determined by the recorded control signal corresponding to a previously-recorded scene, while the recording heads are rotated in synchronism with the vertical synchronism with the vertical synchronizing signal contained in the new video signal.

To carry out recording under the control of the tracking servo system, the tape must be reversed for at least a short distance adhead of the edit point. Then, the new scene is recorded, beginning at the edit point, only after the tape has been advanced for that short distance. Thus, the track pitch for the new video signal matches that of the previously recorded video signal, and picture degradation or synchronization confusion is avoided at the edit point.

According to conventional editing techniques, the tape is returned for a short distance to reverse it for the above-mentioned short distance.

The tape is stopped after predetermined amount of tape is returned. Then, when it is desired to record the new scene, the advancement of the tape is commenced immediately prior to the recording of the new scene for synchronization of the tracking servo system. However, when the tape is re-started in the forward direction by releasing the pause button, the tracking servo circuit cannot be locked-in immediately after the restarting thereof.

In other words, if the servo circuit has an ideal rising characteristic relative to tape transportation as shown by a straight broken line a in FIG. 1, the servo circuit is immediately locked in at the time when a first control pulse $CTL_1$ and a first RF switching pulse $P_1$ are coincident with one-other. However, the servo circuit doesn't have such a quick response, the servo circuit enters into the lock-in condition after quite a long time passes. Now assuming that the rising characteristic of the servo circuit is poor as shown by one-dot dash line b in FIG. 1, the servo circuit is indicated to be locked-in at the time when a fourth control signal $CTL_4$ and a sixth RF switching pulse $P_6$ are coincident with one other.

This means that a conventional editing system has the disadvantage that it takes a relatively long time for the servo circuit to fall into the lock-in condition.

On the other hand, in the above-described type of the editing system, it is frequently required to confirm or monitor a recording condition or the recorded contents of the previously recorded video signal.

However, the conventional editing system has another disadvantage in that the system is not provided with a monitoring function which prevents the shift of the edit point.

OBJECTS AND SUMMARY OF THE INVENTION

It is an object of the present invention to provide a simple and straightforward technique including apparatus for editing a video signal in a manner that avoids the problems encountered with conventional techniques.

It is another object of this invention to provide an editing technique utilizing the improved servo mechanism having a relatively quick and precise response to control the sequence of steps involved in the editing technique.

It is still another object of this invention to provide an editing technique wherein the previously recorded video signals can be monitored for a predetermined interval before the edit point.

According to one aspect of the present invention, there is provided a video tape recorder in which when a record mode is changed into a pause mode, the tape is entered into a rewind mode and in this rewind mode, control pulses are counted to a first predetermined number so that said tape is stopped having a circuit for further rewinding the tape by a second predetermined number of the control pulses upon a record confirmation operation in the tape stop mode, a circuit for reproducing the tape by a number of the control pulses corresponding substantially to a total number of the first and second predetermined numbers and a circuit for rewinding the tape after the reproduction of the tape by the reproducing circuit is finished and stopping said tape after detecting that the control pulses are counted to nearly the first predetermined number.

The other objects, features and advantages of the present invention will become apparent from the following description taken in conjunction with the accompanying drawings through which the like references designate the same elements and parts.

BRIEF DESCRIPTION OF THE DRAWINGS

FIGS. 5 and 6 are connection diagrams showing one example of a practical circuitry of an essential part of the video tape recorder according to the present invention.

DESCRIPTION OF THE PREFERRED EMBODIMENT

To facilitate the understanding of a video tape recorder according to the present invention, an outline thereof will be described first.

Figure 2:
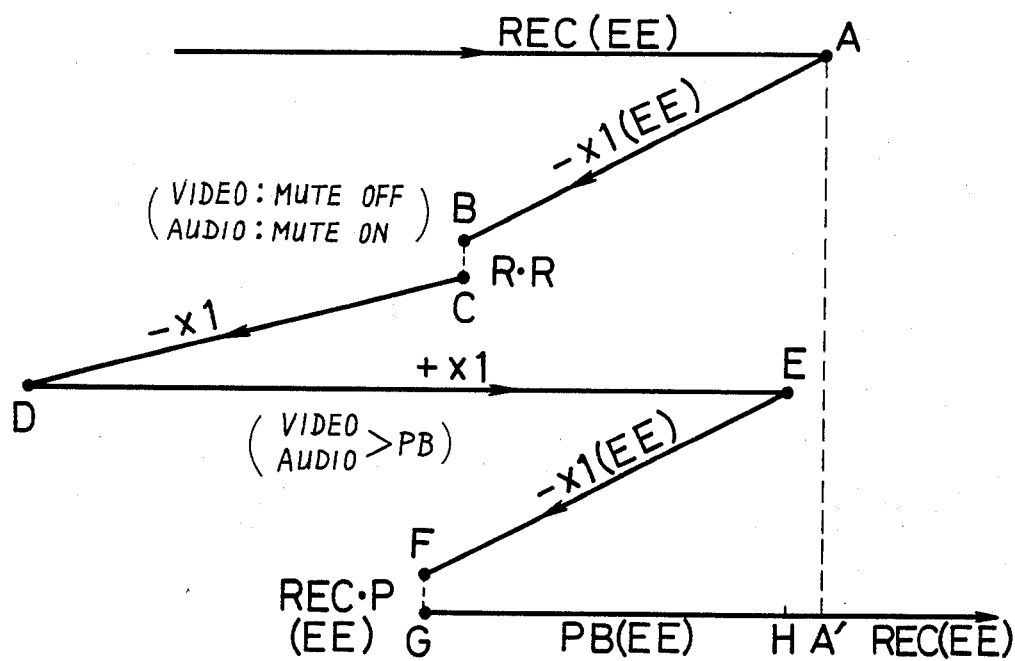

As shown in FIG. 2, during the recording of the video signal, when a pause mode command is issued at time point A, the recording of the video signal is stopped and at the same time, under the condition that pinch rollers are tightly pressed against a capstan with the magnetic tape gripped therebetween, a capstan motor rotates in the reverse direction so that while the control signal recorded on the magnetic tape is counted, the magnetic tape is reversed at a predetermined speed, for example, at a speed of one time a normal speed by a predetermined amount of, for example, 15 frames and then stopped at time point B. Thereafter, when a record review (R.R) button which is attached on a body of video camera is depressed to generate a record confirmation command at time point C, the magnetic tape is further reversed at a predetermined speed, for example, at a speed of one time the normal speed by a predetermined amount of, for example, 42 frames while the control signal formed thereon is counted and then reaches time point D. Then, from the time point D, the operation mode is changed into playback mode and the magnetic tape is transported in the forward direction at a predetermined speed, for example, at a speed of one time the normal speed by a predetermined amount of, for example, 54 frames (about 1.8 seconds) while the control signal formed thereon is counted and reaches time point E. Therefore, in the period from the time points D to E, the video signal previously recorded can be confirmed or monitored. Also, it is desirable that the magnetic tape is not forwarded up to the time point A, but this forward running of the tape is stopped at the time point E, which is a couple of frames ahead of the time point A, for example, 3 frames.

When the magnetic tape reaches this time point E, the magnetic tape is advanced again in the reverse direction by the amount of 15 frames in a similar manner as that from the time points A to B and then stopped at time point F, at which the VTR enters into a record pause (REC·P) mode. In this case, it is arranged that if this record pause mode (REC·P) continues for a predetermined time duration, for example, several minutes, the VTR is automatically changed to the stop mode.

Then, at time point G, when the pause release command is issued, the magnetic tape starts to run in the forward direction so as to reproduce the control signal previously recorded by a predetermined amount of, for example, 12 frames, in which the phase of the control signal of the video signal to be recorded subsequently is controlled to be coincident with the phase of the reproducing signal in the interval from time points G to H and under the condition that after the phases of the new and old control signals are perfectly coincided with one other, the tape is transported and the VTR starts to record the new signal from time point H and in the interval from time points H to A', a new signal is superimposed upon the picture already recorded in order to prevent a portion or section of the magnetic tape, which has not yet recorded, from occurring.

Figure 1:
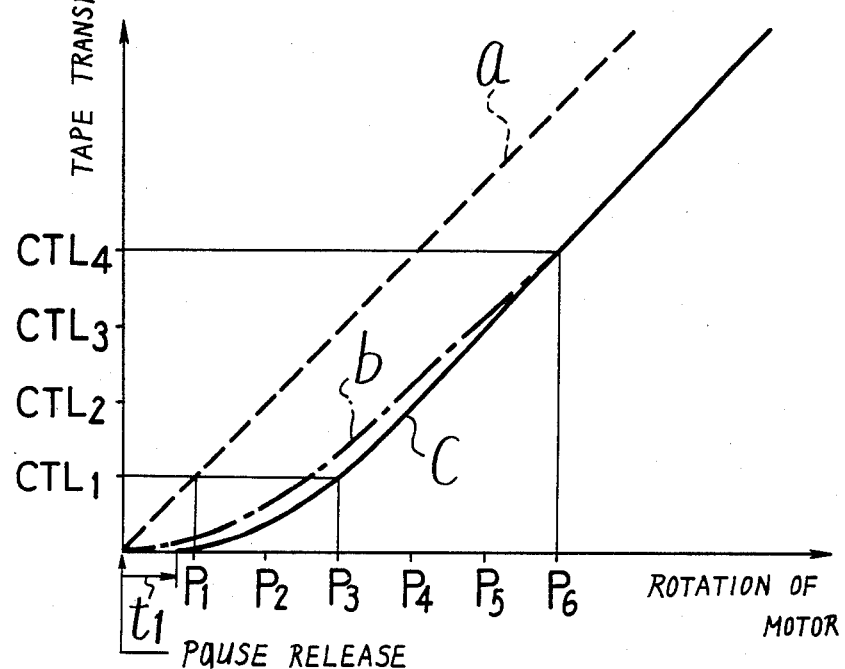
FIGS. 1 and 2 are graphs used to explain a video tape recorder according to the present invention.

In this case, at the time point C where the VTR is released from the pause mode, as shown in FIG. 1, a right time when the motor rises is substantially deviated by time period $t_1$ to shorten a time at which the control signal is synchronized with the RF switching pulse, so that the motor servo becomes effective faster. For example, FIG. 1 shows a case where during time points when the pause mode is released and when the first control pulse $CTL_1$ and the third RF switching pulse $P_3$ are coincided with each other, the servo becomes active for the motor.

Now, one embodiment of a video tape recorder according to the present invention will hereinafter be described in detail with reference to FIG. 3.

Figure 3:
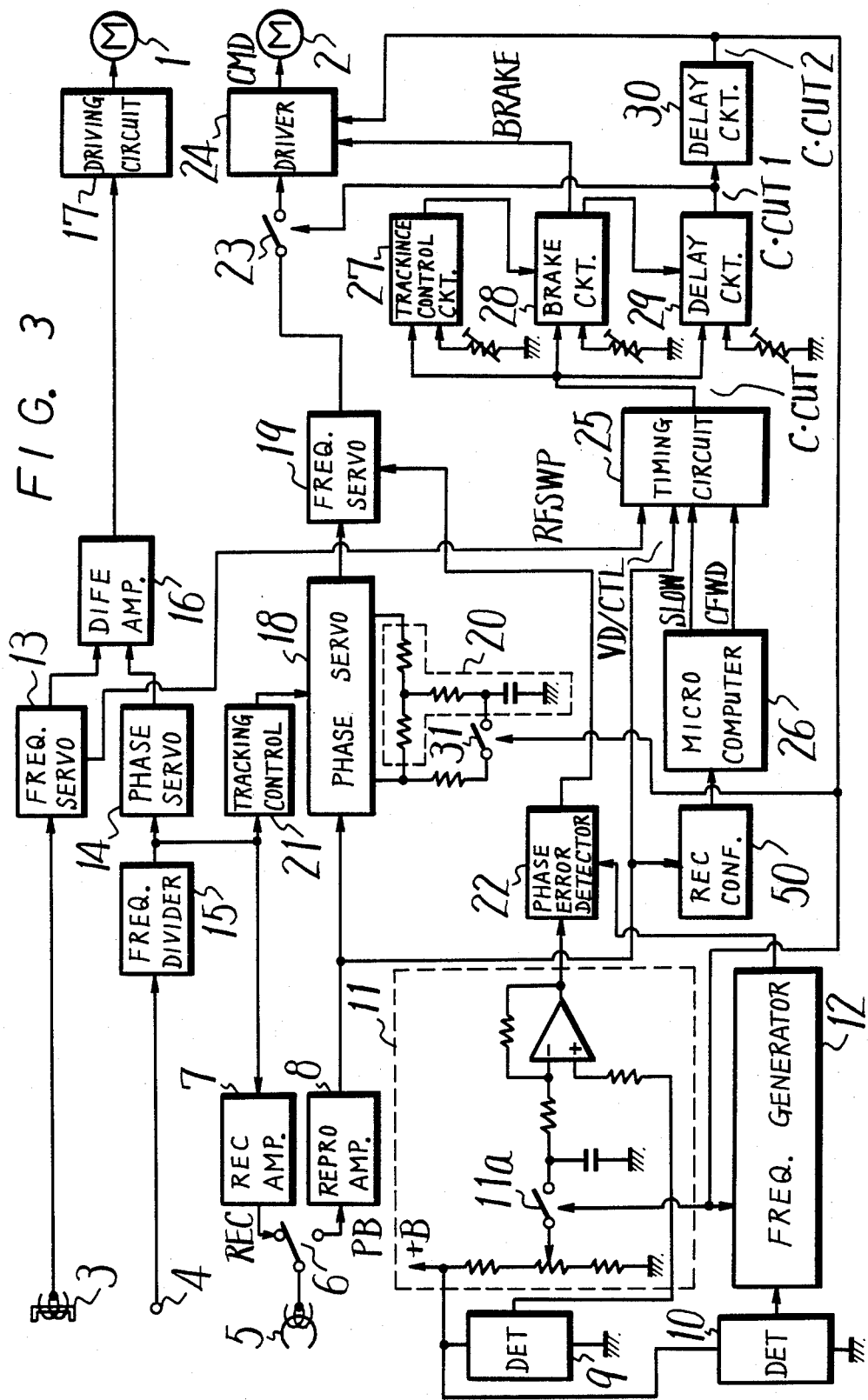
FIG. 3 is a schematic block diagram showing one embodiment of a video tape recorder according to the present invention.

In FIG. 3, reference numeral 1 denotes a drum motor, 2 a capstan motor and 3 denotes a pulse generator being provided on a head drum (not shown), which is operated in ganged relation with the drum motor 1, for generating a pulse which magnetically shows a rotary phase of a magnetic transducer head. Reference numeral 4 denotes an input terminal to which a vertical synchronizing signal with a frequency of 60 Hz synchronously separated from a video signal is applied as a servo reference signal. Numeral 5 denotes a control (CTL) head, 6 a record change-over switch, 7 a control signal recording amplifier, 8 a control signal reproducing amplifier, 9 and 10 magnetic detectors for detecting a rotation of the capstan motor 2, 11 and 12 frequency generators for generating frequencies responsive to the rotation speed of the capstan motor 2 in accordance with the outputs from the magnetic detectors 9 and 10, 13 and 14 a frequency servo circuit and a phase servo circuit each forming a drum servo system, 15 a frequency divider for frequency-dividing the vertical synchronizing signal with a frequency of 60 Hz supplied from the input terminal 4 by ½ so as to achieve a signal with a frequency of 30 Hz and numeral 16 designates a differential amplifier supplied with the outputs from the servo circuits 13 and 14.

The differential amplifier 16 produces at its output side a signal corresponding to a speed error or a phase error, which is supplied through a driving circuit or driver 17 to the drum motor 1 to thereby permit the rotation of the head drum (not shown) in gang with this drum motor 1 to be controlled.

Also, upon recording, the signal with a frequency of 30 Hz produced at the output side of the frequency divider 15 is supplied as the control signal through the recording amplifier 7 to the control head 5, by which it is recorded on a magnetic tape (not shown) and then used as a reference signal upon reproducing.

Numerals 18 and 19 denote respectively, a phase servo circuit and a frequency servo circuit for a capstan motor servo system, 20 a phase compensating circuit or compensator, 21 a tracking control circuit or controller and 22 denotes a phase error detecting circuit or detector. Upon playback mode the reproducing control signal, which is supplied from the control head 5 to the reproducing amplifier 8, is fed through the phase servo circuit 18 to the frequency servo circuit 19 in which it is compared with a signal, which is produced from the frequency generators 11 and 12 and then delivered through the phase error detector 22 to the frequency servo circuit 19. The error signal therefrom is supplied through a switch 23, which is closed in the normal operation mode, and a driving circuit or driver 24 to the capstan motor 2, by which the feeding of the magnetic tape by the capstan motor 2 in synchronism with the rotation phase of the magnetic transducer head is controlled to make the tracking effective.

Figure 4:
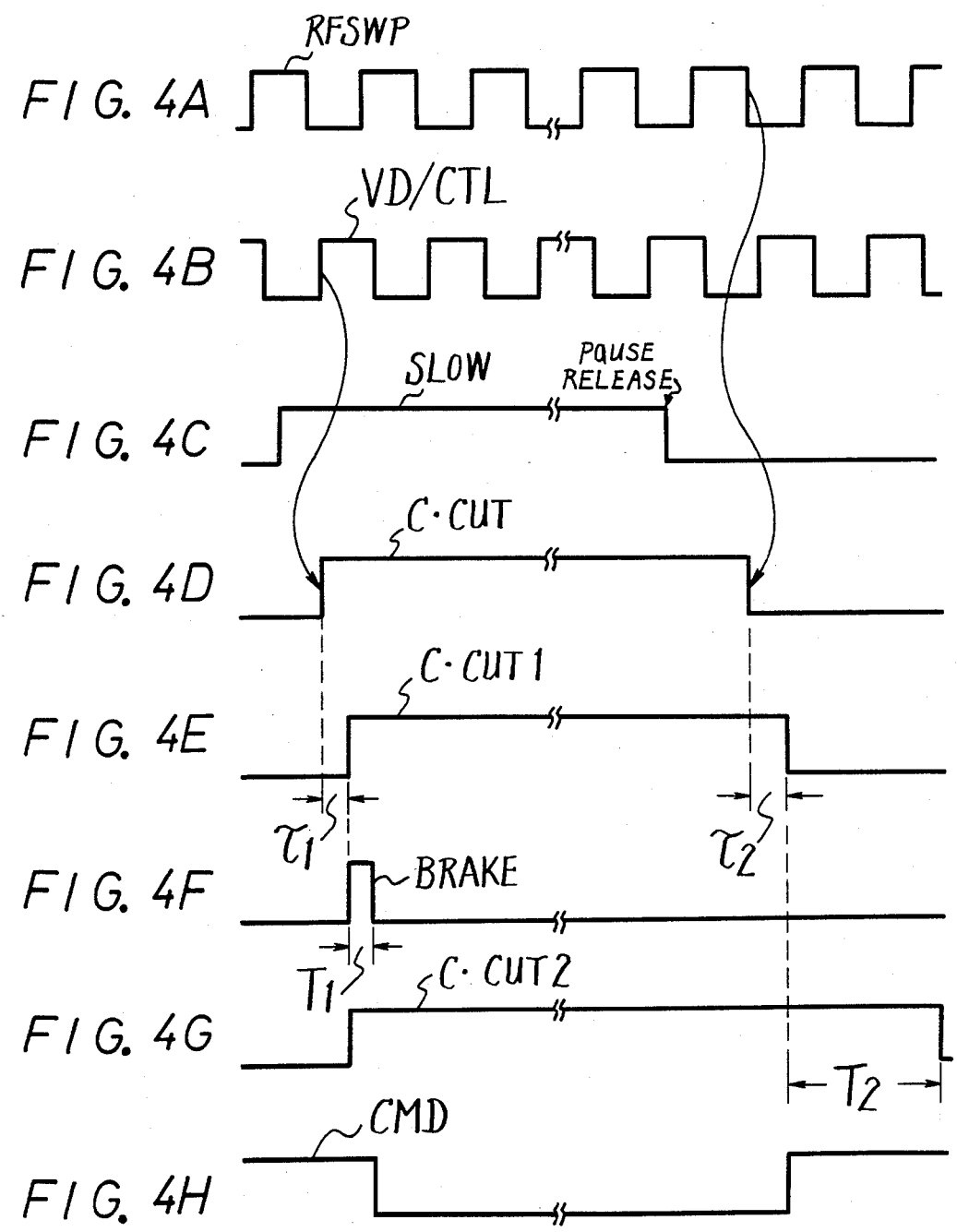
FIGS. 4A to 4H are waveform diagrams each used to explain the operation of the video tape recorder according to the present invention in FIG. 3.

Reference numeral 25 denotes a timing signal generating circuit which is supplied at its input side with various kinds of command signals including an RF switching pulse RFSWP produced at the output side of the frequency servo circuit 13 and whose waveform is shown in FIG. 4A, a control signal VD/CTL, which is one of the signals applied to the control head 5 in the recording mode and supplied during the playback mode through a contact of PB (Playback) side of the change-over switch 6 to the output side of the reproducing amplifier 8 and whose waveform is shown in FIG. 4B and a pause command signal SLOW supplied from a microcomputer 26 and whose waveform is shown in FIG. 4C. When it receives the pause command signal SLOW from the microcomputer 26, the timing signal generating circuit 25, in time at which the phases of the RF switching pulse RFSWP and the control signal VD/CTL are coincided with one other, produces a signal C·CUT which, as shown in FIG. 4D, rises in synchronism with the rise of the control signal VD/CTL and thereafter upon the pulse release command, falls in synchronism with the fall of the RF switching pulse RFSWP.

The signal C·CUT from this timing signal generating circuit 25 is respectively supplied to a tracking control circuit 27, a braking circuit 28 and a continuous recording delay circuit 29, all of which are provided at the output side of the timing signal generating circuit 25. The tracking control circuit 27 serves such that it delays the leading or front edge of the signal C·CUT supplied therein by a predetermined time period $\tau_1$ as illustrated in FIG. 4E so as to form a timing for generating a still picture without noise. On the other hand, the continuous recording delay circuit 29 acts such that it delays the trailing or rear edge of the signal C·CUT supplied therein by a predetermined time period $\tau_2$ (which, namely, corresponds to the time period $t_1$ as seen in FIG. 1) as shown in FIG. 4E so as to form a timing so that the servo may become effective as soon as possible.

As a result, at the output side of the continuous delay circuit 29 is produced a signal C·CUT$_1$ which is the signal where the leading and trailing edges of the signal C·CUT are delayed by the predetermined amounts as described above and whose waveform is shown in FIG. 4E. This signal C·CUT$_1$ serves to control the opening and/or closing of the switch 23 located between the frequency servo circuit 19 and the driving circuit 24. In this case, by the signal C·CUT$_1$, this switch 23 is controlled such that when the signal C·CUT$_1$ is at low level or upon normal operation mode, it is closed but when the signal C·CUT$_1$ stays at high level or upon continuous recording mode, it is opened.

The braking circuit 28 also produces at its output side a braking signal BRAKE with a predetermined pulse width $T_1$ as shown in FIG. 4F in response to the output signal from the tracking control circuit 27, in other words, in substantially synchronism with the rise of the signal C·CUT$_1$ shown in FIG. 4E. The predetermined pulse width $T_1$ of this braking signal BRAKE is decided by a predetermined braking width in such a manner that the stop position of the capstan motor 2 always becomes a constant stop position.

The output signal C·CUT$_1$ of the continuous recording delay circuit 29 is further delivered to a delay circuit 30 in which the trailing edge thereof is delayed by a predetermined time period $T_2$, for example, one second, so that the delay circuit 30 produces at its output side a signal C·CUT$_2$ as illustrated in FIG. 4G. This predetermined time period $T_2$ is provided to make the servo effective or captured as soon as possible upon continous recording mode. More precisely, to make the servo effective as fast as possible upon continuous recording mode, the signal C·CUT$_2$ having its length extended by the predetermined time period $T_2$ functions such that it closes a switch 31, which is made open by the signal C·CUT$_2$ upon normal operation mode and a switch 11a located within the frequency generator 11 (like switch is also provided within the frequency generator 12 though not shown in the figure) so as to make time constants of the phase compensating circuit 20 and the frequency generators 11, 12 smaller than those upon normal operation mode. Also, this signal C·CUT$_2$ is supplied to the driving circuit 24, by which the operation of the driving circuit 24, which is pulse-driven in about 20% of its power upon normal operation mode, is raised up to nearly 90% upon continuous recording mode thus the servo being made effective quicker or faster.

Accordingly, the capstan motor 2 stopped by the fact that a driving signal CMD from the driving circuit 24 is interrupted in synchronism with the fall of the braking signal BRAKE as shown in FIG. 4H, starts to rotate when it is supplied with the driving signal CMD having substantially the continuous recording delay time $\tau_2$ after the pause mode is released. Then, during time period $T_2$ immediately after the capstan motor 2 starts to rotate, when the control signal VD/CTL and the RF switching pulse RFSWP are synchronized with each other, the servo rapidly becomes active for the capstan motor 2.

Reference numeral 50 designates a record conforming circuit for confirming whether or not the place previously recorded is surely recorded or whether a new picture can be connected to the preceding picture or not when a picture is recorded by a video camera provided with a record review button, further details of which will be described later.

FIG. 5 shows an example of practical circuitry pertaining to the timing signal generating circuit 25, the tracking control circuit 27, the braking circuit 28, the continuous recording delay circuit 29 and a part of driving section in FIG. 3 in which like references corresponding to those of FIG. 3 designate the same elements and parts.

The timing signal generating circuit 25 includes D flip-flop circuits 25a, 25b and a transistor 25c in which input terminals D of the flip-flop circuits 25a, 25b to which the pause command signal SLOW is supplied from the microcomputer 26 (FIG. 3) are connected together, an inverting output terminal $\overline{Q}$ of the flip-flop circuit 25a is connected to a clear terminal CL of the flip-flop circuit 25b, a preset terminal PS of the flip-flop circuit 25a is connected both to an inverting output terminal $\overline{Q}$ of the flip-flop circuit 25b and an input side of the braking circuit 28, a clear terminal CL of the flip-flop circuit 25a is grounded and a clock terminal C of this flip-flop circuit 25a is supplied with the RF switching pulse RFSWP which the frequency servo circuit 13 (FIG. 3) produces and delivers through an inverter 25d.

To the base of the transistor 25c is supplied the control signal VD/CTL which the reproducing amplifier 8 (FIG. 3) produces. The emitter of this transistor 25c is grounded and the collector thereof is connected both to a clock terminal C of the flip-flop circuit 25b and connected through a resistor 25e to a positive voltage supply source terminal +Vcc.

An output terminal Q of this flip-flop circuit 25b is connected to its preset terminal PS, anode sides of diodes 27a, 27b in the tracking control circuit 27 and also cathode sides of diodes 29a, 29b in the continuous recording delay circuit 29. The cathodes of the diodes 27a, 27b are connected through variable resistors 27c, 27d together to one end of a resistor 32, respectively, while the anodes of the diodes 29a, 29b are connected through variable resistors 29c, 29d together to the one end of the resistor 32. The other end of this resistor 32 is grounded via a capacitor 33. These resistor 32 and capacitor 33 are made common for use in the tracking control circuit 27 and the continuous recording delay circuit 29. Also, the diode 27a, the resistor 27c, the diode 29a and the resistor 29c form a charge and/or discharge loop of the capacitor 33 upon a forward direction (FWD) rotation of the capstan motor 2 (FIG. 3), while the diode 27b, the resistor 27d, the diode 29b, and the resistor 29d form a charge and/or discharge loop of the capacitor 33 upon a reverse direction (REV) rotation thereof. These charge and/or discharge loops are switchably changed by a switch, which is not shown in the figure and controlled to open and/or close by the command signal CFWD from the microcomputer 26 in response to the rotation direction. If the variable resistors 27c and 29c are adjusted respectively, it becomes possible to set the delay times $\tau_1$ and $\tau_2$ in FIG. 4E at desired values.

The one end of the resistor 32 is connected to an AND circuit 34 at its common connection input terminal at which two input terminals thereof are connected together. The output side of this AND circuit 34 is connected through a resistor 35 to a base of a transistor 36 which serves for preventing the braking circuit 28 from misoperating and also to one input terminal of an AND circuit 28a provided within the braking circuit 28. This AND circuit 34 is also made common for use in the tracking control circuit 27 and the continuous recording delay circuit 29, which serves to decide or set the level of the signal C·CUT$_1$ flowing therethrough.

The other input terminal of the AND circuit 28a is connected through resistors 28b, 28c and the variable resistor 28d to the inverting output terminal $\overline{Q}$ of the flip-flop circuit 25b in the timing signal generating circuit 25 and also grounded through the resistor 28b and a capacitor 28e. In this case, if the variable resistor 28d is adjusted, it is possible to set the pulse width of the braking signal BRAKE (which in other words corresponds to the predetermined pulse width T$_1$ in FIG. 4F) at a desired and proper value. Also, between a common connection point of the resistor 28b with the capacitor 28e and the output terminal of the AND circuit 28a are connected a resistor 28f and a diode 28g, each of which is serially connected, by which the fall of the braking signal BRAKE is made more abrupt.

Numerals 37 and 38 respectively denote AND circuits serving for deciding the direction of the forward and reverse directions and the AND circuit 37 is used for the continuous recording mode and the AND circuit 38 is used for the normal operation mode. Each of the input terminals of these AND circuits 37 and 38 is supplied with the signal CFWD delivered from the microcomputer 26 (FIG. 3) for driving the capstan motor 2 (FIG. 3) in the forward direction, so that when the AND gate 37 is opened by the output from the AND circuit 28a upon the continuous recording mode, a transistor 39 connected thereto is made ON to produce a reversed signal $\overline{SREV}$ and also upon the normal operation mode, when the AND circuit 38 is opened by the output from the AND circuit 34, the transistor 39 also connected thereto is made ON to achieve the reversed signal $\overline{SREV}$.

Further, the output signal of the AND circuit 28a, namely, the braking signal BRAKE is supplied through a diode 40 to a base of a transistor 41 which then produces at its emitter a drive control signal CERR and delivers the same to the driving section (not shown).

The operations of the circuitry in FIG. 5 will be described next. In the initial operation mode, the output terminals Qs of the flip-flop circuits 25a and 25b in the timing signal generating circuit 25 stay at high level (H) and low level (L), respectively. When the signal SLOW as shown in FIG. 4C is inputted to the D input terminals of the flip-flop circuits 25a, 25b by the pause command originated from the microcomputer 26 (FIG. 3), in time point at which the control signal VD/CTL is supplied, the output terminal Q of the flip-flop circuit 25b is inverted from low level (L) to high level (H) so that at the output side of the timing signal generating circuit 25 is achieved the signal C·CUT whose waveform is shown in FIG. 4D. This signal C·CUT is supplied, for example, upon the forward direction (FWD), through the side of the diode 27a to the capacitor 33 to be charged therein, so that the AND circuit 34 produces at its output side the signal C·CUT$_1$ which as shown in FIG. 4E, rises with the delay time $\tau_1$ to be decided substantially by the time constant of the capacitor 33 and the resistor 27c.

Also, in the initial operation mode, the preset terminal PS of the flip-flop circuit 25a is set at a high level (H) by the output from the inverting output terminal $\overline{Q}$ of the flip-flop circuit 25b and hence a high level signal $\overline{C·CUT}$ is supplied therefrom through the resistor 28d and so on to the capacitor 28e to charge the same, by which the level of the other input terminal of the AND circuit 28a is held high in level. Accordingly, as described above, when the signal C·CUT$_1$ achieved at the output side of the AND circuit 34 becomes high level (H), the AND circuit 28a opens its gate to produce at its output side the braking signal BRAKE having the braking pulse width T$_1$ as shown in FIG. 4F, which will be determined by the time constant of the capacitor 28e and the resistors 28c, 28d. This braking signal BRAKE is not only supplied to the AND circuits 37, 38 in which it is utilized to achieve the reversed signal $\overline{SREV}$ but also supplied to the transistor 41 as the driving control signal.

On the other hand, as shown in FIG. 4C, when the signal SLOW falls in association with the pause release command, since the level of the output terminal Q of the flip-flop circuit 25a changes to the low level (L) in synchronism with the fall of the RF switching pulse RFSWP immediately after the pause release command and also the level of the inverting output terminal $\overline{Q}$ thereof changes to the high level (H), the output terminal Q of the flip-flop circuit 25b becomes low level and the inverting output terminal $\overline{Q}$ thereof becomes high level, by which the high level (H) of the inverting output terminal $\overline{Q}$ of this flip-flop circuit 25b presets the flip-flop circuit 25a, so that the output terminal Q thereof becomes high level so as to return the mode to the initial operation mode.

Further, due to the fact that the output terminal Q of the flip-flop circuit 25b becomes low level, charges accumulated or stored in the capacitor 33 is discharged through the side of the diode 29a upon, for example, the forward direction transportation so that the signal C·CUT achieved at the output side of the AND circuit 34 falls as shown in FIG. 4E with the delay time $\tau_2$ which will be substantially decided by the time constant of the capacitor 33 and the resistor 29c. In other words, the timing at which the rise characteristic of the capstan motor 2 is shifted only by the time t$_1$ as shown in FIG. 1 which is equivalent to this delay time $\tau_2$. Then, during the predetermined time T$_2$ (FIG. 4G) soon after the capstan motor 2 starts to drive, the capstan motor 2 is controlled in such a manner as to make the time constants of the servo system smaller than those of the normal operation mode, so that the servo will become effective faster.

Figure 6:
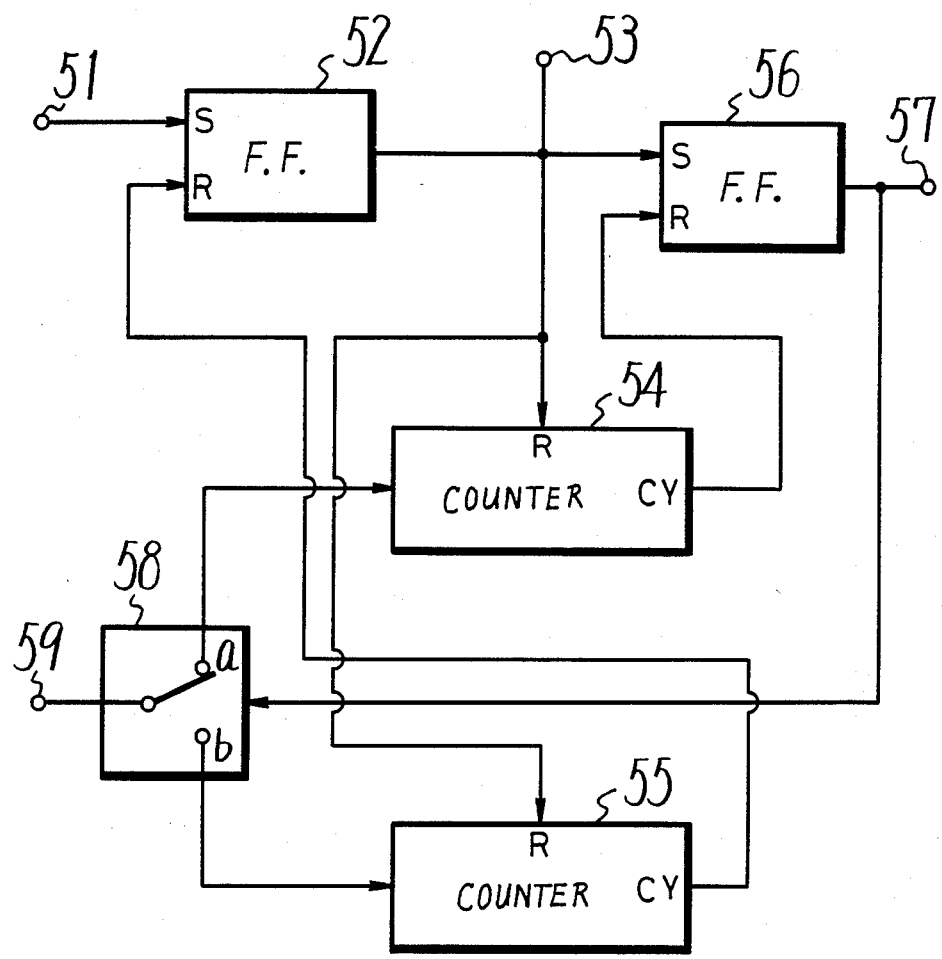

FIG. 6 shows an example of a practical configuration of the record confirming circuit 50 (FIG. 3). In this circuit, the operations from the time point C to the time point E in FIG. 2 are carried out.

In FIG. 6, to a terminal 51 is connected a record review button switch though not shown in the figure. When this record review button switch is depressed or made ON, a flip-flop circuit 52 is set and hence the output thereof becomes high level. This high level signal is supplied through a terminal 53 to the microcomputer 26 (FIG. 3) to thereby permit the VTR system to enter into the playback mode and also to counters 54 and 55 to reset them. At the same time, a flip-flop circuit 56 is triggered by the signal from the flip-flop circuit 52, so that its output becomes high level. The high level signal derived from the flip-flop circuit 56 is fed through a terminal 57 to the microcomputer 26 (FIG. 3), by which this microcomputer 26 supplies the reversed command signal to the servo system of the capstan motor 2 (FIG. 3) so as to make the capstan motor 2 in a reverse mode.

At this time, the output of the flip-flop circuit 56 is further delivered to a switch circuit 58 so as to connect it to the side of a contact a, so that the reproducing control signal supplied from the reproducing amplifier 8 (FIG. 3) to an input terminal 59 is delivered to the counter 54. When the counter 54 counts the reproducing control signal of 42 frames, namely, 42 reproducing control signals, it produces a carry signal and then supplies it to the flip-flop circuit 56 to reset the same, so that the capstan motor 2 is made in the mode of the normal rotation and the contact of the switch circuit 58 is changed from the contact a to that b to thereby allow the reproducing control signal to be fed to the counter 55.

When the counter 55 counts the reproducing control signal of 54 frames, namely, 54 reproducing control signals, it produces a carry signal and then supplies it to the flip-flop circuit 52 to reset the same, so that all the operations from the time point C to the time point E in FIG. 2 are completed.

Also, owing to the state that the flip-flop circuit 52 was reset, such state of the flip-flop circuit 52 is transmitted from the terminal 53 to the microcomputer 26. Thus, the microcomputer 26 produces the signal SLOW so that the VTR enters again into the operation mode shown in the time points A and B in FIG. 2 for rewinding the tape by 15 frames like the periods shown by the time points A to B. Then, from the time point E to the time point A', operations relevant to the above continuous recording mode are performed.

As described above, according to the video tape recorder of the present invention, since the picture can continuously or consistently be connected and/or recorded on the tape in accuracy and it is also possible to confirm whether the place or portion previously recorded is surely recorded or not or whether new picture can continously or consistently connected to the picture recorded previously, the highly precise record and/or reproduction of the picture having no such unnaturalness as a disturbance of the picture on the connection point of the video images becomes possible.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

What is claimed is:

1. A method for controlling advancement of tape in forward or reverse direction in a video tape recorder for use in editing information signals recorded on the tape, including a tape drive for advancing a tape in a forward direction and a reverse direction, said video tape recorder having a record mode in which an information signal including control signals is recorded on said tape such that the tape has said control signals recorded thereon at regularly spaced intervals along a longitudinal track, a playback mode, and an edit mode in which a second information signal may be recorded on said tape beginning at a selected edit point to follow a first information signal, and further having a pause mode wherein, when said video tape recorder enters said pause mode at a selected edit point on said tape, said tape drive means advances said tape in said reverse direction by a first length corresponding to a first predetermined number of said control signals, so that a portion of said first information signal recorded immediately preceding said edit point may be monitored prior to said video tape recorder entering said edit mode, said method comprising the steps of:

entering said pause mode to advance said tape in said reverse direction by said first predetermined number of control signals, advancing said tape in said reverse direction by a second length corresponding to a second predetermined number of said control signals, advancing said tape in said forward direction in said playback mode by a length of the tape substantially corresponding to the total of said first and second predetermined numbers of said control signals, and reentering said pause mode for further reversing said tape by said first length corresponding to said first predetermined number of control signals after the finish of said forwarding operation.

2. A video tape recorder for use in editing information signals recorded on a tape, including tape drive means for advancing a tape in a forward direction and a reverse direction, said video tape recorder having a record mode in which an information signal including control signals is recorded on said tape such that the tape has said control signals recorded thereon at regularly spaced intervals along a longitudinal track, a playback mode, and an edit mode in which a second information signal may be recorded on said tape beginning at a selected edit point to follow a first information signal, and further having a pause mode wherein, when said video tape recorder enters said pause mode at said selected edit point on said tape, said tape drive means advances said tape in said reverse direction by a first length corresponding to a first predetermined number of said control signals, so that said second information signal may be accurately recorded on said tape immediately following said edit point, said video tape recorder comprising:

microcomputer means for controlling the mode of operation of said video tape recorder, including the control of said tape drive means;

a source of an actuating signal for selecting a review mode to follow said pause mode during which a portion of said first information signal recorded immediately preceding said edit point may be monitored;

actuating means responsive to said actuating signal, after said tape has been advanced in said reverse direction by said first length in said pause mode, for generating a first output, said first output being supplied to said microcomputer means to cause said video tape recorder to enter said review mode;

first means for generating a second output having high and low states supplied to said microcomputer means, said first means being responsive to said first output to generate said second output in said high state, said microcomputer thereupon causing said tape drive means to advance said tape farther in said reverse direction by a second length corresponding to a second predetermined number of said control signals, said first means thereafter automatically generating said second output in its low state;

said microcomputer means responsive to said low state of said second output for causing said video tape recorder to automatically enter said playback mode wherein said tape drive means advances said tape in said forward direction; and reproducing means for determining when said tape has been advanced by a third length slightly less than the total of said first and second lengths corresponding to a third number of control signals, and to generate a third output thereon;

said first actuating means responsive to said third output to cease generating said first output, such that said microcomputer means causes said video tape recorder to enter said pause mode, thereby causing said tape drive means to again advance said tape in said reverse direction by said first length;

said videotape recorder being adapted to thereafter enter said edit mode.

3. A video tape recorder according to claim 2, wherein said first means includes a first counter selectively supplied with said control signals reproduced from said tape for counting said control signals, said first counter being reset by said first output and generating a fourth output after said second predetermined number of control signals have been counted; and a flip-flop which is set by said first output and reset by said fourth output to generate said high and low states of said second output, respectively.

4. A video tape recorder according to claim 3, wherein said reproducing means includes a second counter selectively supplied with said reproduced control signals for counting said control signals, said second counter being reset by said first output and generating said third output after said third number of control signals have been counted.

5. A video tape recorder according to claim 4, wherein said actuating means includes a second flip-flop which is set by said actuating signal to generate said first output, and reset by said third output to cease generating said first output.

6. A video tape recorder according to claim 5, including switch means common to said first means and said reproducing means for supplying said control signals to said first counter when said second output is in its high state and to said second counter when said second output is in its low state.

* * * * *